United States Patent
Lee et al.

(10) Patent No.: US 11,415,204 B2
(45) Date of Patent: Aug. 16, 2022

(54) LINEAR MOTION SYSTEM

(71) Applicant: TBI MOTION TECHNOLOGY CO., LTD., New Taipei (TW)

(72) Inventors: Ching-Sheng Lee, New Taipei (TW); Tien-Chang Wu, New Taipei (TW)

(73) Assignee: TBI MOTION TECHNOLOGY CO., LTD., New Taipei (TW)

( * ) Notice: Subject to any disclaimer, the term of this patent is extended or adjusted under 35 U.S.C. 154(b) by 72 days.

(21) Appl. No.: 17/089,484

(22) Filed: Nov. 4, 2020

(65) Prior Publication Data

US 2021/0140521 A1 May 13, 2021

(30) Foreign Application Priority Data

Nov. 8, 2019 (CN) .......................... 201921918327.1

(51) Int. Cl.
*F16H 25/22* (2006.01)
*F16H 25/20* (2006.01)

(52) U.S. Cl.
CPC ..... *F16H 25/2209* (2013.01); *F16H 25/2009* (2013.01); *F16H 25/2214* (2013.01)

(58) Field of Classification Search
CPC .......................... F16H 25/2009; F16H 25/2209
See application file for complete search history.

(56) References Cited

U.S. PATENT DOCUMENTS

| | | | | |
|---|---|---|---|---|
| 2,978,920 A | * | 4/1961 | Sears et al. .............. | B23Q 5/56 74/441 |
| 3,059,494 A | * | 10/1962 | Grabowski ......... | F16H 25/2209 74/89.42 |
| 3,393,576 A | * | 7/1968 | Carlson ............... | F16H 25/2209 74/89.42 |
| 3,393,577 A | * | 7/1968 | Better ................. | F16H 25/2418 74/441 |
| 4,487,087 A | * | 12/1984 | Johnstone ................ | B23Q 5/56 74/89.42 |
| 4,679,457 A | * | 7/1987 | Nishikawa .......... | F16H 25/2009 74/89.42 |
| 5,582,072 A | * | 12/1996 | Yamaguchi ......... | F16H 25/2209 74/89.42 |
| 9,279,487 B1 | | 3/2016 | Guglietti | |
| 2015/0377719 A1 | * | 12/2015 | Tsai .................... | F16H 25/2204 374/107 |

FOREIGN PATENT DOCUMENTS

| KR | 10-1991-0014632 A | 8/1991 |
|---|---|---|
| WO | 83/02142 A1 | 6/1983 |

* cited by examiner

*Primary Examiner* — Terence Boes
(74) *Attorney, Agent, or Firm* — Muncy, Geissler, Olds & Lowe, P.C.

(57) ABSTRACT

A linear motion system comprises a guiding member, a moving member, a plurality of rolling members and a preload adjusting module. The moving member is slidably disposed on the guiding member. The moving member and the guiding member together form a circulation path. When the guiding member moves with relative to the moving member, the moving member can generate a linear movement with relative to the guiding member. The rolling members are accommodated in the circulation path. The preload adjusting module is disposed on the moving member, and comprises a preload assembly and a preload regulator. The preload regulator applies a thrust to the preload assembly to adjust a preload value generated by the rolling members and applied to the moving member.

14 Claims, 10 Drawing Sheets

LINEAR MOTION SYSTEM

CROSS REFERENCE TO RELATED APPLICATIONS

This Non-provisional application claims priority under 35 U.S.C. § 119(a) on Patent Application No(s). 201921918327.1 filed in People's Republic of China on Nov. 8, 2019, the entire contents of which are hereby incorporated by reference.

BACKGROUND

Technology Field

This disclosure relates to a linear motion system and, in particular, to a linear motion system capable of adjusting the offset preload without disassembling the device.

Description of Related Art

The linear motion device, such as a ball screw, is widely used in many machining equipment. The configuration of the linear motion device is to provide a precise transmission function, so that the supported stage or object can be moved in a straight line by rotating and linear movements of mechanical operations. The currently used ball screw device mainly comprises a screw, a nut and a plurality of balls. The outer surface of the screw is configured with a spiral groove, and the inner surface of the nut is also configured with an inner spiral groove. The spiral groove of the screw and the inner spiral groove of the nut can together form a raceway, and the balls are contained in the raceway. The balls are capable of rolling with relative to the screw and the nut, thereby reducing the relative rotation friction between the screw and the nut.

In practice, the ball screw device with one nut cannot withstand the large load requirements of heavy machines, so the double-nut ball screw device is invented to solve this problem. In the double-nut ball screw device, a preload between two nuts is provided to eliminate the elastic deformation between the two nuts and the screw caused by the axial load, thereby achieving high positioning accuracy. In order to provide the preload between two nuts, a preload spacer can be disposed between two nuts, so that the grooves of the nuts and the screw can have sufficient offset to achieve the offset preload.

However, the above-mentioned double-nut ball screw device needs to add a preload spacer between two nuts, so the amount of total components of the entire device is larger, which may easily affect the positioning accuracy of the entire device due to the tolerance generated in the manufacturing process. In addition, when it is known that the preload has been shifted, the conventional technology is to stop the processing operation and disassemble the ball screw device for replacing components and/or adjusting the offset preload between the balls and the nuts. This adjusting method will increase a lot of operation time and cost, and the production capacity will be reduced.

SUMMARY

An objective of this disclosure is to provide a linear motion system that can adjust the offset preload value without disassembling the device, thereby performing the adjustment of offset preload without increasing the operation time and cost, and with quite limited impact on production capacity.

To achieve the above, the disclosure provides a linear motion system, which comprises a guiding member, a moving member, a plurality of rolling members, and a preload adjusting module. The moving member is slidably disposed on the guiding member. The moving member and the guiding member together form at least one circulation path. When the guiding member moves with relative to the moving member, the moving member generates a linear movement with relative to the guiding member. The rolling members are accommodated in the circulation path. The preload adjusting module is disposed on the moving member and comprises a preload assembly and a preload regulator. The preload regulator applies a thrust to the preload assembly to adjust a preload value generated by the rolling members and applied to the moving member.

In one embodiment, a direction of the thrust is perpendicular to a long-axis direction of the guiding member.

In one embodiment, the moving member comprises at least one nut, or at least one nut and a carrier body, or a sliding block.

In one embodiment, the moving member comprises two nuts and a carrier body, the carrier body has a through hole, and the two nuts are individually disposed in the through hole.

In one embodiment, the preload assembly comprises an adjusting member and an adjusting rod, the adjusting member is disposed on one of the nuts and tightly fitted to a periphery of the nut, and one end of the adjusting rod is disposed on the adjusting member.

In one embodiment, the adjusting member comprises two adjusting sub-members.

In one embodiment, the preload regulator is disposed at one side of the carrier body facing toward the adjusting member.

In one embodiment, the preload regulator applies the thrust to the adjusting rod for adjusting the preload value generated by the rolling members and applied to the moving member through the adjusting member.

In one embodiment, one end surface of the preload regulator contacts against the adjusting rod for applying the thrust in a constant value to the adjusting rod.

In one embodiment, the preload regulator is a damp thruster.

In one embodiment, the preload regulator has a cone side surface, the cone side surface contacts against the adjusting rod, and a moving direction of the preload regulator is parallel to the long-axis direction of the guiding member.

In one embodiment, the linear motion system further comprises a preload sensing member and a monitoring device. The preload sensing member is disposed on the moving member, and the monitoring device is electrically connected to the preload sensing member.

In one embodiment, the preload sensing member detects the preload value to output a detecting signal to the monitoring device.

In one embodiment, the monitoring device comprises a display monitor, and the monitoring device enables the display monitor to display a current preload value in real-time according to the detecting signal.

In one embodiment, the monitoring device transmits the detecting signal and the preload value to a cloud device for performing statistics and analysis of data and signals.

In one embodiment, the monitoring device is configured in a cloud device.

In one embodiment, the linear motion system is applied to a ball screw, a single-axis motion device, or a linear motion guide device.

As mentioned above, in the linear motion system of this disclosure, the moving member is slidably disposed on the guiding member, and when the guiding member moves with relative to the moving member, the moving member generates a linear movement with relative to the guiding member. The preload adjusting module is disposed on the moving member and comprises a preload assembly and a preload regulator. The preload regulator applies a thrust to the preload assembly to adjust a preload value generated by the rolling members and applied to the moving member. Accordingly, the linear motion system of this disclosure can utilize the preload regulator and the preload assembly of the preload adjusting module to adjust the preload value, which is generated by the rolling members and applied to the moving member, without disassembling the device, thereby achieving the desired offset preload and the function of semi-automatic or manual compensation. Moreover, this disclosure can adjust the offset preload value without disassembling the device, thereby performing the adjustment of offset preload without increasing the operation time and cost, and with quite limited impact on production capacity.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

The linear motion systems of the following embodiments are applied to, for example, ball screws, but this disclosure is not limited thereto. In different embodiments, the linear motion system of this disclosure can be also applied to the single-axis motion device, single-axis robot, or linear motion guide device.

Figure 1:
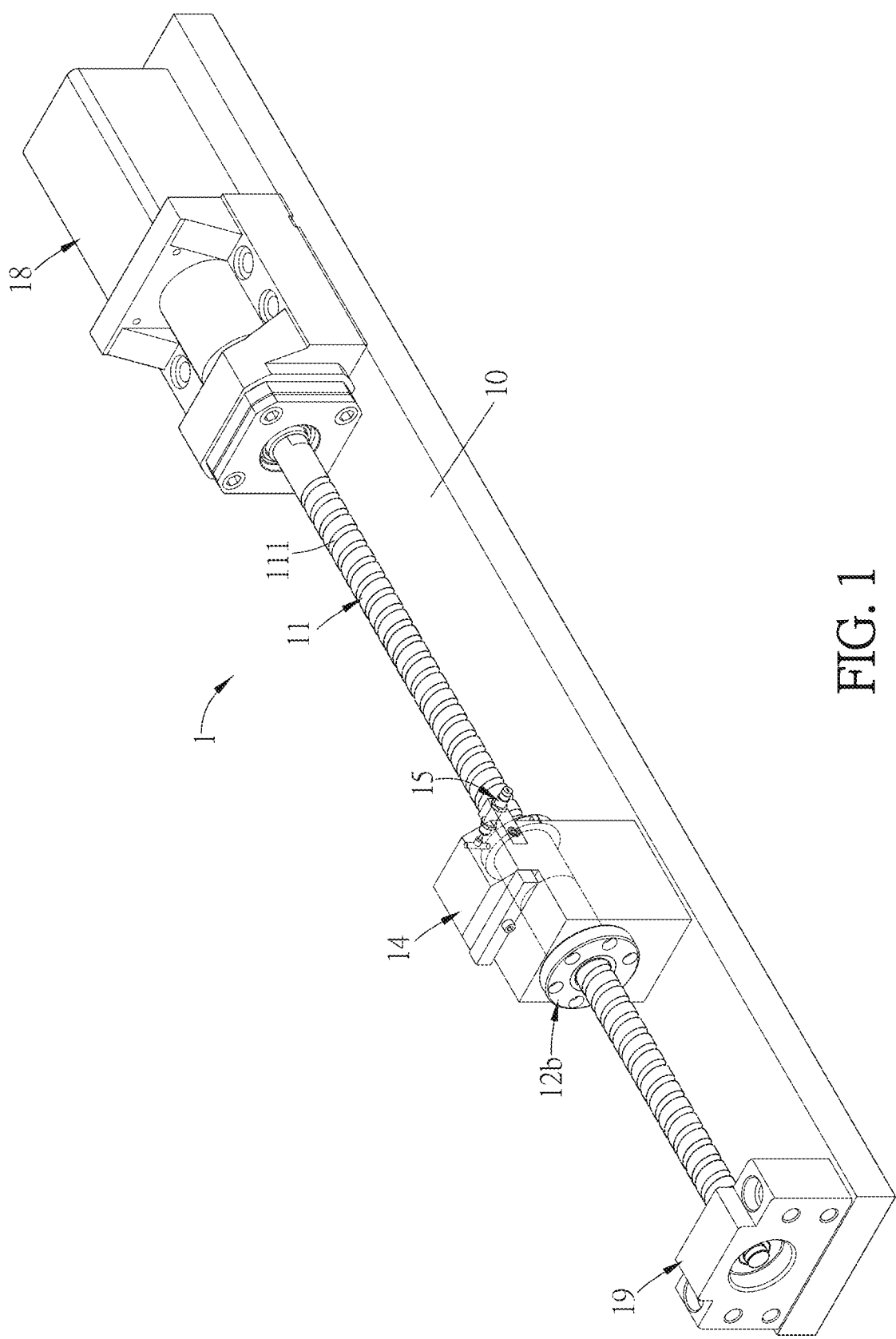
FIG. 1 is a schematic diagram showing a linear motion system according to an embodiment of this disclosure.
Figure 2:
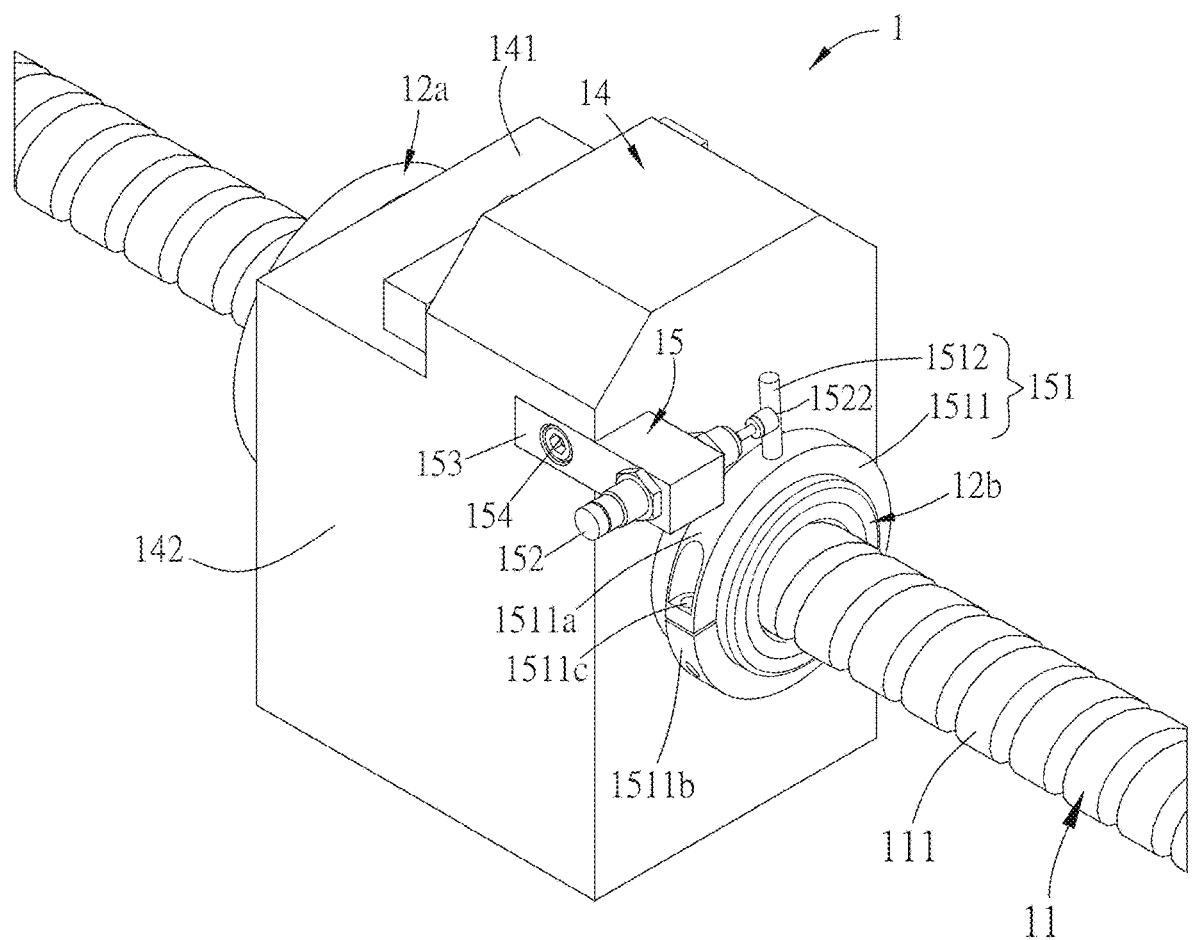
FIG. 2 is a schematic diagram showing a part of the linear motion system of FIG. 1.
Figure 3:
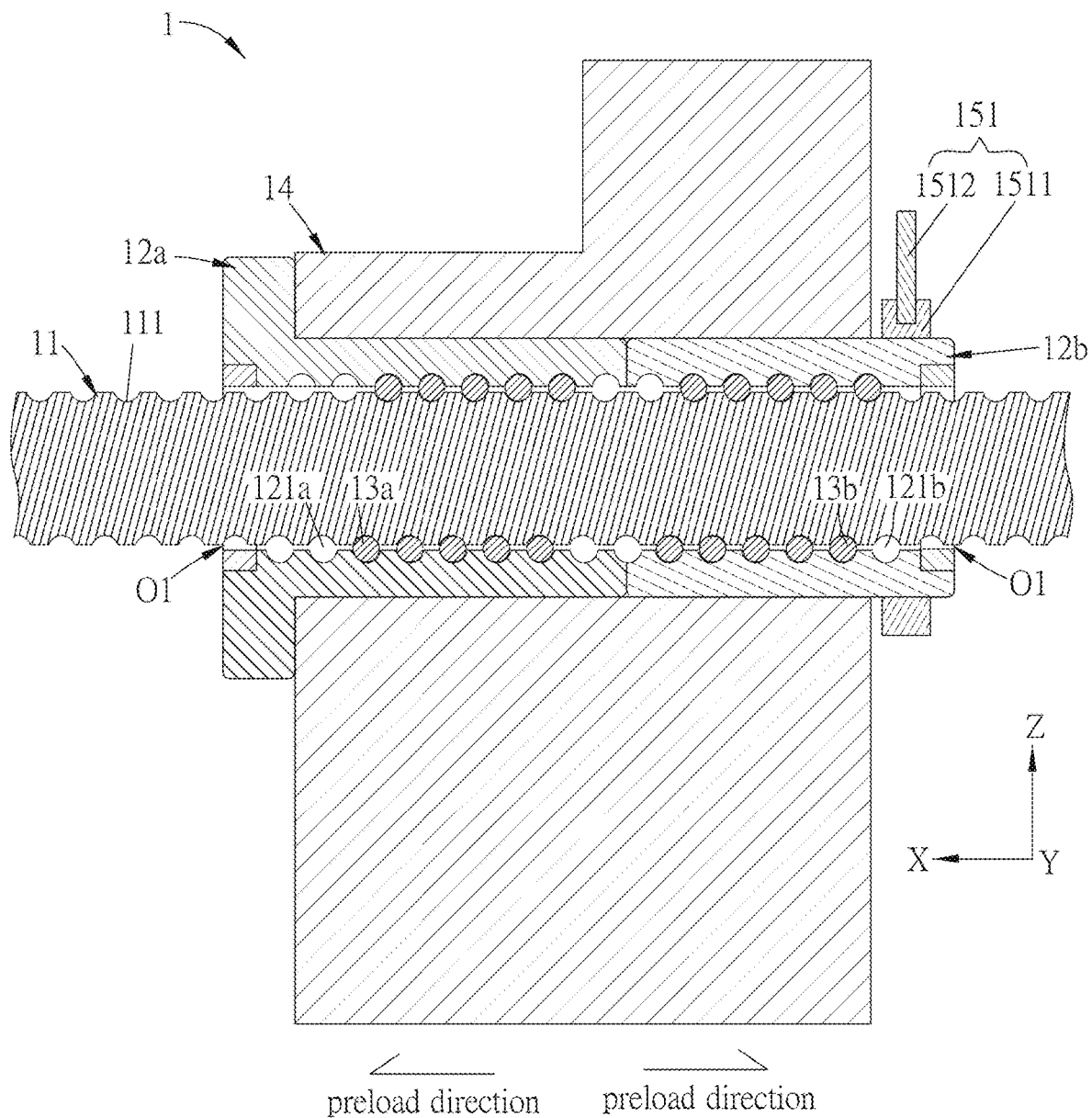
FIG. 3 is a sectional view showing a part of the linear motion system of FIG. 1.

FIG. 1 is a schematic diagram showing a linear motion system according to an embodiment of this disclosure, FIG. 2 is a schematic diagram showing a part of the linear motion system of FIG. 1, and FIG. 3 is a sectional view showing a part of the linear motion system of FIG. 1.

Referring to FIGS. 1 and 2, the linear motion system 1 of this embodiment comprises a guiding member 11, a moving member, a plurality of rolling members 13a and 13b (FIG. 3), and a preload adjusting module 15. In addition, the linear motion system 1 of this embodiment can further comprise a transmission device 18, an installation base 19, and a supporting stage 10, wherein the guiding member 11, the moving member, the transmission device 18 and the installation base 19 are disposed on the supporting stage 10.

In this embodiment, the guiding member 11 is a cylindrical rod, and the outer surface of the guiding member 11 is configured with a continuous winding spiral groove 111 along the axis direction of the cylindrical rod (e.g. the long-axis direction of the guiding member 11). In this case, for example, the guiding member 11 is a (ball) screw, and is configured with one continuous winding spiral groove 111. In another embodiment, if the guiding member 11 is a multi-thread screw, it may comprise two continuous winding spiral grooves. In yet another embodiment, the guiding member 11 can be a linear sliding rail of a linear motion guide device.

The moving member is slidably disposed on the guiding member 11. In addition, the moving member and the guiding member 11 together form at least one circulation path, and the rolling members 13a and 13b are accommodated in the circulation path. When the guiding member 11 moves with relative to the moving member (including displacement or rotation), the moving member generates a linear movement with relative to the guiding member 11 in the long-axis direction of the guiding member 11. In some embodiments, the moving member comprises at least one nut, or at least one nut and a carrier body, or a sliding block. For example, if the moving member comprises one nut, the line motion system may comprise a single-nut ball screw device. If the moving member comprises two nuts, the line motion system may comprise a double-nut ball screw device. If the moving member comprises one sliding block, the line motion system may comprise a single-axis motion device, a single-axis robot, or a linear motion guide device. Referring to FIG. 3, the line motion system of this embodiment is, for example, a double-nut ball screw device, which includes two nuts 12a and 12b.

Referring to FIG. 3, each of the nuts 12a and 12b of this embodiment is configured with a through hole O1, and the guiding member 11 is disposed through the through holes O1 of the nuts 12a and 12b, so that the two nuts 12a and 12b can individually slide on the guiding member 11. In addition, the moving member of this embodiment further comprises a carrier body 14, and the nuts 12a and 12b are disposed at two opposite sides of the carrier body 14, respectively. Specifically, the carrier body 14 comprises a through hole, and the nuts 12a and 12b can be disposed in the through hole of the carrier body 14 through two sides of the through hole. In this embodiment, the nuts 12a and 12b can be disposed on the carrier body 14 by, for example, screwing or any of other suitable ways, so that the above-mentioned moving member can comprise the carrier body 14 and the nuts 12a and 12b.

In addition, the inner surfaces of the nuts 12a and 12b are configured with inner spiral grooves 121a and 121b, respectively, corresponding to the spiral groove 111 of the guiding member 11. A part of the spiral groove 111 and each of the inner spiral grooves 121a and 121b of the nuts 12a and 12b can together form an internal raceway. Besides, those skilled persons in the art all know that in order to form individual circulation paths between the guiding member 11 and the nuts 12a and 12b, it is possible to provide the circulation members or reflow members (not shown) in the nuts 12a and 12b to form a circulation channel (or reflow channel) together with a part of the spiral groove 111. Accordingly, each of the nuts 12a and 12b can individually form an independent circulation path together with the guiding member 11, and the rolling members 13a and 13b can be disposed and circulated in the corresponding circulation paths, respectively. When the guiding member 11 rotates with respect to the nuts 12a and 12b, the nuts 12a and 12b and the carrier body 14 (the moving member) can generate a linear movement in the long-axis direction of the guiding member 11 with respect to the guiding member 11. In this embodiment, the rolling members 13a and 13b are balls for example. In other embodiments, the rolling members 13a and 13b can also be rollers.

Referring to FIG. 1, one end of the guiding member 11 is connected to the transmission device 18, and the guiding member 11 is disposed through the moving member (including the carrier body 14 and the nuts 12a and 12b). The other end of the guiding member 11 is installed on the installation base 19. Accordingly, when the transmission device 18 rotates, the guiding member 11 can be driven to rotate with respect to the nuts 12a and 12b, so that the nuts 12a and 12b and the carrier body 14 can generate a linear movement in the long-axis direction of the guiding member 11 with respect to the guiding member 11. In some embodiments, the transmission device 18 can be, for example but not limited to, a hollow shaft motor. In some processing embodiments, the carrier body 14 can support or connect the to-be-processed object. When the guiding member 11 rotates with respect to the nuts 12a and 12b, the carrier body 14 and the to-be-processed object can generate the linear movement with respect to the guiding member 11 for performing the following processes. In some embodiments, if the moving member excludes the carrier body 14, the nut(s) may support or connect the to-be-processed object.

As mentioned above, in this embodiment, when the double-nut ball screw device operates to generate relative motion between the guiding member 11 and the moving member (including the nuts 12a and 12b and the carrier body 14), the multiple rolling members 13a and 13b (balls) in the inner raceway can provide preloads to the nuts 12a and 12b, respectively, thereby eliminating the elastic deformation between the moving member and the guiding member 11 caused by the axial load, and thus maintaining the stiffness of the entire device and system. Accordingly, the ball screw device can achieve high positioning accuracy. Taking the nut 12a shown in the left side of FIG. 3 as an example, the upper rolling members (balls) 13a can provide a preload to the nut 12a in the direction from down-right to up-left, and the lower rolling members (balls) 13a can provide a preload to the nut 12a in the direction from up-right to down-left.

Referring to FIGS. 2 and 3, the preload adjusting module 15 is disposed on the moving member and comprises a preload assembly 151 and a preload regulator 152. The preload regulator 152 contacts the preload assembly 151 and applies a thrust to the preload assembly 151 to adjust the preload value, which are generated by the rolling members 13a and 13b, and applied to the moving member. The direction of the thrust is perpendicular to the long-axis direction of the guiding member 11. In this embodiment, the preload assembly 151 comprises an adjusting member 1511 and an adjusting rod 1512. The adjusting member 1511 is disposed on one of the nuts 12a and 12b and tightly fitted to a periphery of the nut 12a or 12b, and one end of the adjusting rod 1512 is disposed on the adjusting member 1511. In this embodiment, the adjusting member 1511 is disposed at one side of the nut 12b away from the nut 12a and is tightly fitted to the periphery of the nut 12b. In another embodiment, the adjusting member 1511 can be disposed at one side of the nut 12a away from the nut 12b and is tightly fitted to the periphery of the nut 12a. Alternatively, two adjusting members 1511 are provided and disposed at the peripheries of the nuts 12a and 12b, respectively, and this disclosure is not limited thereto.

In this embodiment, the adjusting member 1511 has a ring shape and at least comprises two adjusting sub-members 1511a and 1511b and at least a locking member 1511c (FIG. 2). Each of the adjusting sub-members 1511a and 1511b has a half-ring shape, and the adjusting sub-members 1511a and 1511b are assembled around the nut 12b by the locking member(s) 1511c (e.g. screws), thereby forming the adjusting member 1511. Accordingly, the adjusting member 1511 can be easily assembled, and the tightness of the assembled adjusting sub-members 1511a and 1511b can be adjusted by the locking member 1511c. In addition, one end of the adjusting rod 1512 is inserted into a recess of the adjusting member 1511, so that the adjusting member 1511 can be rotated by the adjusting rod 1512 to press on the outer side of the nut 12b, thereby adjusting the preload value of the ball screw.

Specifically, as shown in FIG. 2, the preload adjusting module 15 of this embodiment can further comprise a fixing member 153, which can fix the preload regulator 152 with a locking member 154 so as to dispose the preload regulator 152 on a side surface 142 of the carrier body 14 facing toward the adjusting member 1511. In this embodiment, the preload regulator 152 penetrates through the fixing member 153, and one end surface 1522 of the preload regulator 152 contacts against the adjusting rod 1512 for providing a constant thrust (constant value) to push (hold) the adjusting rod 1512. The constant thrust can press (hold) the adjusting rod 1512, so that the other end of the adjusting rod 1512 (away from the adjusting member 1511) can also provide a constant force to push (hold) the adjusting member 1511 so as to press the periphery of the nut 12b. Accordingly, the preload value generated by the rolling members (balls) 13a and 13b and applied to the nuts 12a and 12b can be kept in a constant value (e.g. a preset value), thereby achieving the desired offset preload and the function of semi-automatic compensation.

Figure 4:
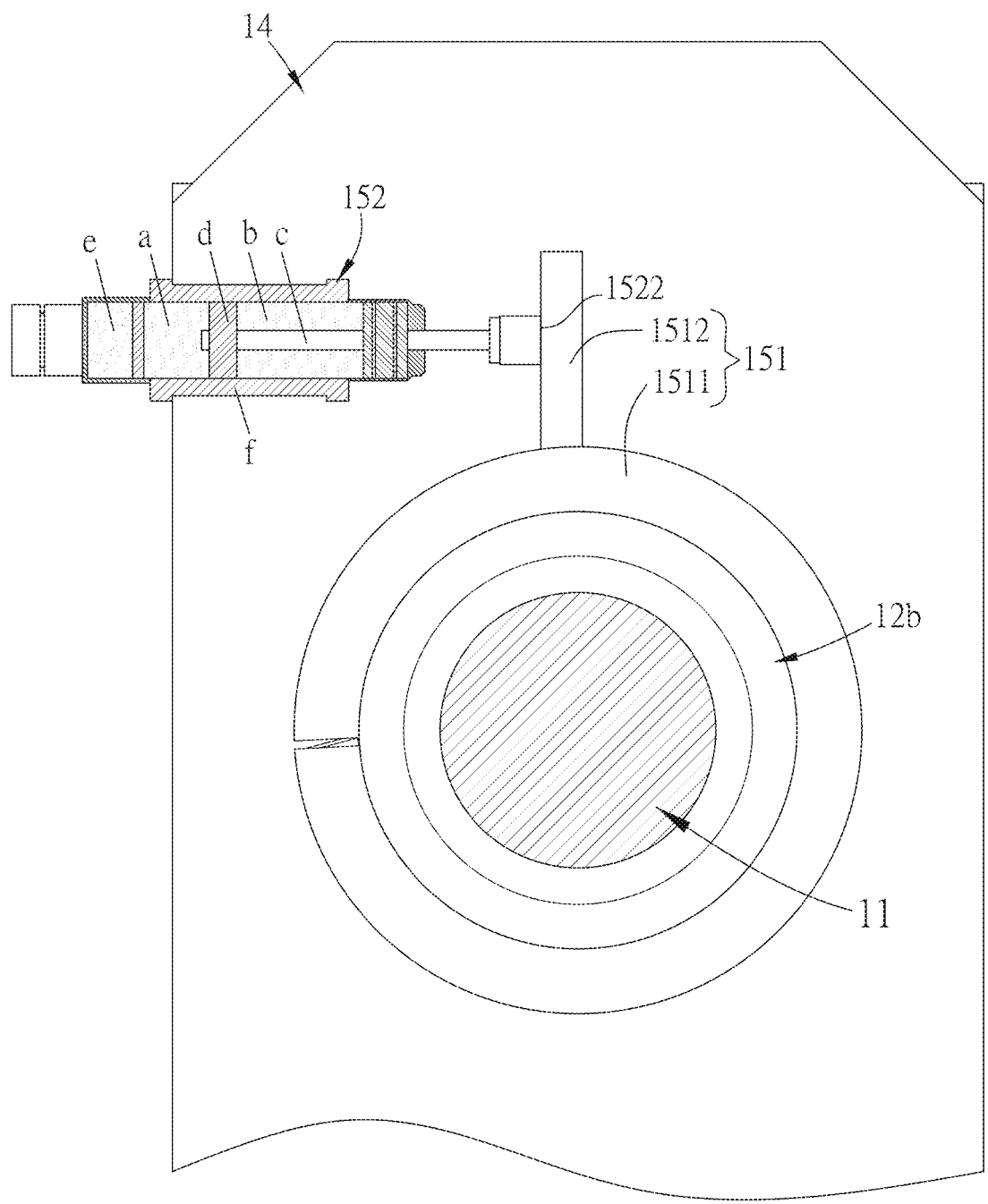
FIG. 4 is a sectional view of the preload regulator according to an embodiment of this disclosure.

FIG. 4 is a sectional view of the preload regulator according to an embodiment of this disclosure. As shown in FIG. 4, the preload regulator 152 is a damp thruster for providing a constant thrust. The preload regulator 152 comprises a housing f, and a first chamber a, a second chamber b, a piston rod c, and a piston (including a gasket and a reed) d are disposed inside the housing f. In addition, the preload regulator 152 may further comprise a third chamber e. The first chamber a and the second chamber b are communicated and filled with oil (that is, the oil can flow between the first chamber a and the second chamber b), and the third chamber e is filled with gas (e.g. nitrogen). When the preload regulator 152 is activated, the gas in the third chamber e is compressed at the same time to balance the internal pressure. The reeds are configured at both sides of the piston d for controlling the opening and closing of the small holes of the piston d. Due to the different sizes of the small holes on both sides during the opening and closing procedures, the speeds of the preload regulator 152 in the compressing period and the rebound period are different, thereby achieving the effect of stabilizing thrust. Therefore, the oil inside the preload regulator 152 can flow between the first chamber a and the second chamber b through the small holes of the piston d, and different resistances are generated through the control of the reeds of the piston d, so that the piston rod c can generate a certain thrust to hold the adjusting rod 1512. Accordingly, a fixed thrust can be provided to the adjusting rod 1512, so as to maintain the preload value, which is generated by the rolling members 13a and 13b and applied to the moving member, to a preset value through the adjusting member 1511.

Accordingly, the linear motion system 1 of this embodiment can utilize the preload regulator 152 and the preload assembly 151 of the preload adjusting module 15 to maintain the preload value between the rolling members 13a and 13b and the nuts 12a and 12b to a preset value without disassembling the device, thereby performing the adjustment of offset preload without increasing the operation time and cost for disassembling the device and without decreasing the production capacity.

Figure 5:
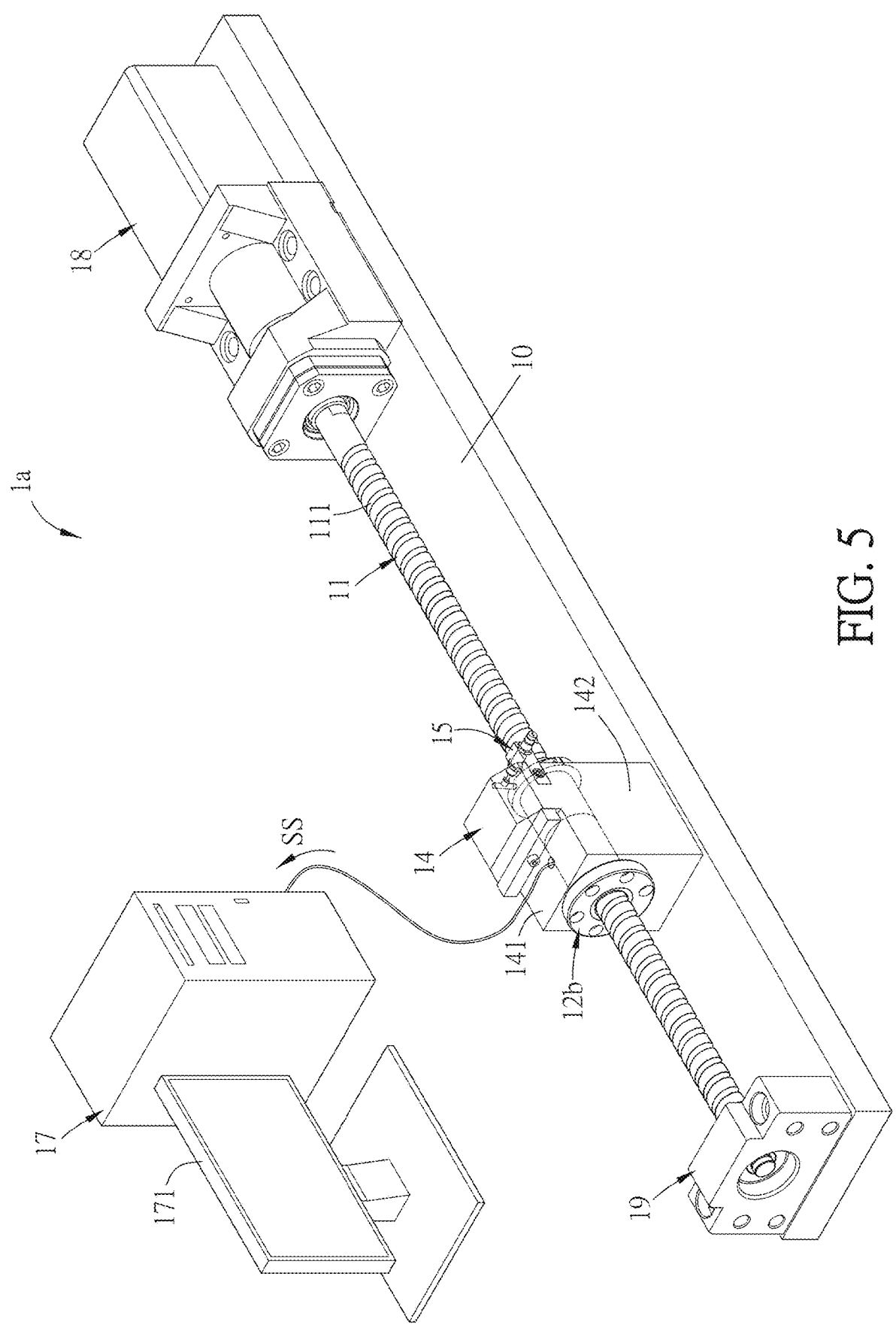
FIG. 5 is a schematic diagram showing a linear motion system according to another embodiment of this disclosure.
Figure 6A:
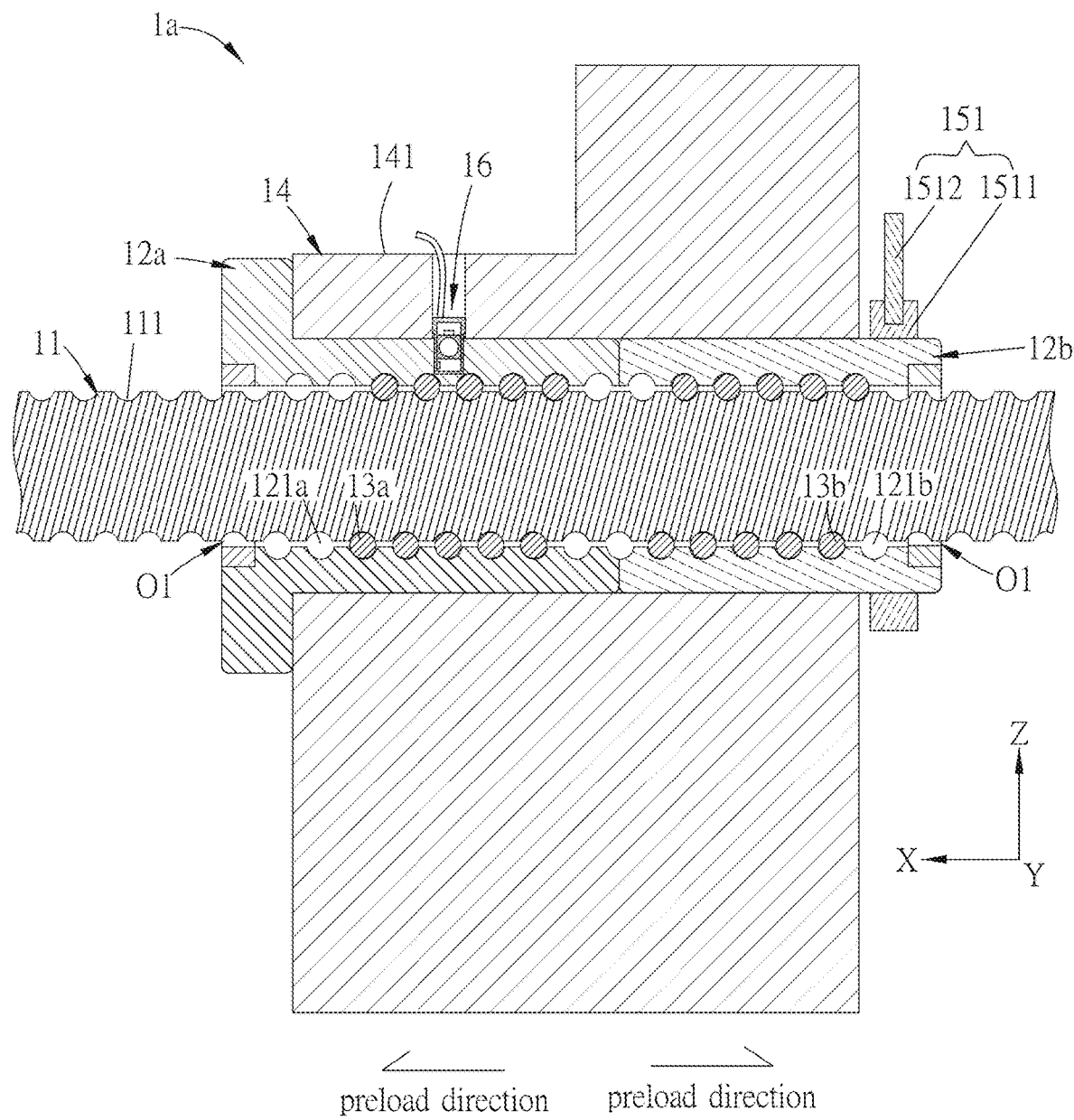
FIG. 6A is a sectional view showing a part of the linear motion system of FIG. 5.

FIG. 5 is a schematic diagram showing a linear motion system according to another embodiment of this disclosure, and FIG. 6A is a sectional view showing a part of the linear motion system of FIG. 5.

Referring to FIGS. 5 and 6A, the linear motion system 1a of this embodiment is mostly the same as the linear motion system 1 of the previous embodiment. Different from the previous embodiment, the linear motion system 1a of this embodiment further comprises a preload sensing member 16 (FIG. 6A) and a monitoring device 17 (FIG. 5). The preload sensing member 16 is disposed on the moving member for detecting the preload value. In this embodiment, the preload sensing member 16 can be disposed on at least one of the nuts 12a and 12b or the carrier body 14, and be electrically connected to the monitoring device 17 for detecting the preload value, which is generated by the rolling members 13a and 13b and applied to the moving member, to output a detecting signal SS to the monitoring device 17. Herein, the shape of the preload sensing member 16 is not limited and can be cylindrical, thin plate, film, or any of other shapes. In this embodiment, the preload sensing member 16 is, for example but not limited to, a strain gauge.

Figure 6B:
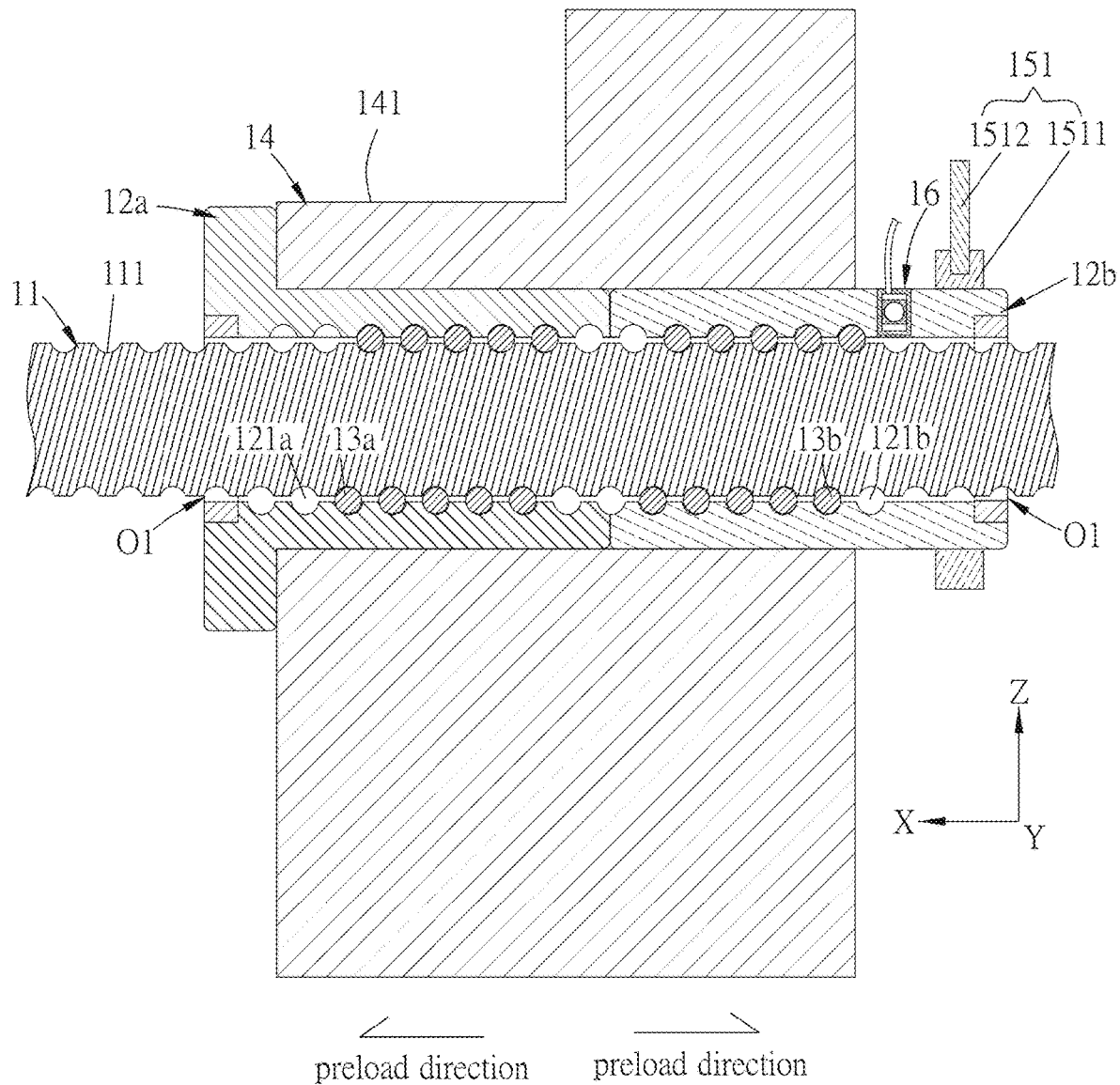
FIG. 6B is another sectional view showing a part of the linear motion system of FIG. 5, wherein the preload sensing member is disposed at another position.

In addition, in this embodiment, one preload sensing member 16 is disposed on the nut 12a (FIG. 6A). In another embodiment, it is possible to configure a plurality of preload sensing members 16 on at least one of the nuts 12a and 12b or the carrier body 14. In one embodiment, the preload sensing member 16 can be disposed on the nut 12b. In one embodiment, at least one preload sensing member 16 is disposed on the nut 12a, and at least one preload sensing member 16 is disposed on the nut 12b. In one embodiment, the preload sensing member 16 is disposed on the carrier body 14. In one embodiment, as shown in FIG. 6B, the preload sensing member 16 is disposed on the nut 12b. This disclosure is not limited thereto. In addition, as shown in FIG. 5, the preload sensing member 16 is disposed on the nut 12a through the top surface 141 of the carrier body 14. In another embodiment, the preload sensing member 16 can be disposed on the nut 12a through the side surface 142 of the carrier body 14, and this disclosure is not limited.

In the linear motion system 1a, when the ball screw device is operated, the horizontal component force in the direction parallel to the long-axis direction (direction X) of the guiding member 11 will be detected by the preload sensing member 16, and then the preload sensing member 16 outputs the detecting signal SS to the monitoring device 17. The monitoring device 17 can obtain the real preload value after calculation. In this embodiment, since the horizontal component force divided by the preload value is equal to the cosine function, if the horizontal component force and the angle between the preload and the horizontal direction are known, the actual preload value can be calculated based on the cosine function.

In addition, the monitoring device 17 can be, for example but not limited to, a computer or a server, and the preload sensing member 16 and the monitoring device 17 can be electrically connected to each other by the wired or wireless method. In this embodiment, the monitoring device 17 is a computer, and is electrically connected to the preload sensing member 16 by the wired method. In this embodiment, the monitoring device 17 may comprise a display monitor 171, and the monitoring device 17 enables the display monitor 171 to display a current preload value in real-time for user's reference after calculation with the received detecting signal SS. In some embodiments, the monitoring device 17 can be disposed at a near end of the ball screw device (around the machine), at a remote end of the ball screw device (e.g. in the central control room), or in a cloud device. If the monitoring device 17 is disposed in a cloud device, the preload sensing member 16 is electrically connected to the monitoring device 17 by the wireless method. In some embodiments, the monitoring device 17 can transmit the detecting signal SS and the preload value to the cloud device for performing the statistics and analysis of data and signals. Accordingly, the users can realize the operation and status of the linear motion system through statistics and analysis information from the cloud device.

In the linear motion system 1a of this embodiment, the preload sensing member 16 can detect the preload generated by the rolling members 13a and 13b and applied to the moving member anytime, and the monitoring device 17 can display the preload value of the system in real-time, so that the user can realize the adjustment status of the preload. This configuration allows the user to conveniently manage or adjust the system for maintaining the system accuracy and avoiding the processed objects that fail to the accuracy requirement.

Figure 7:
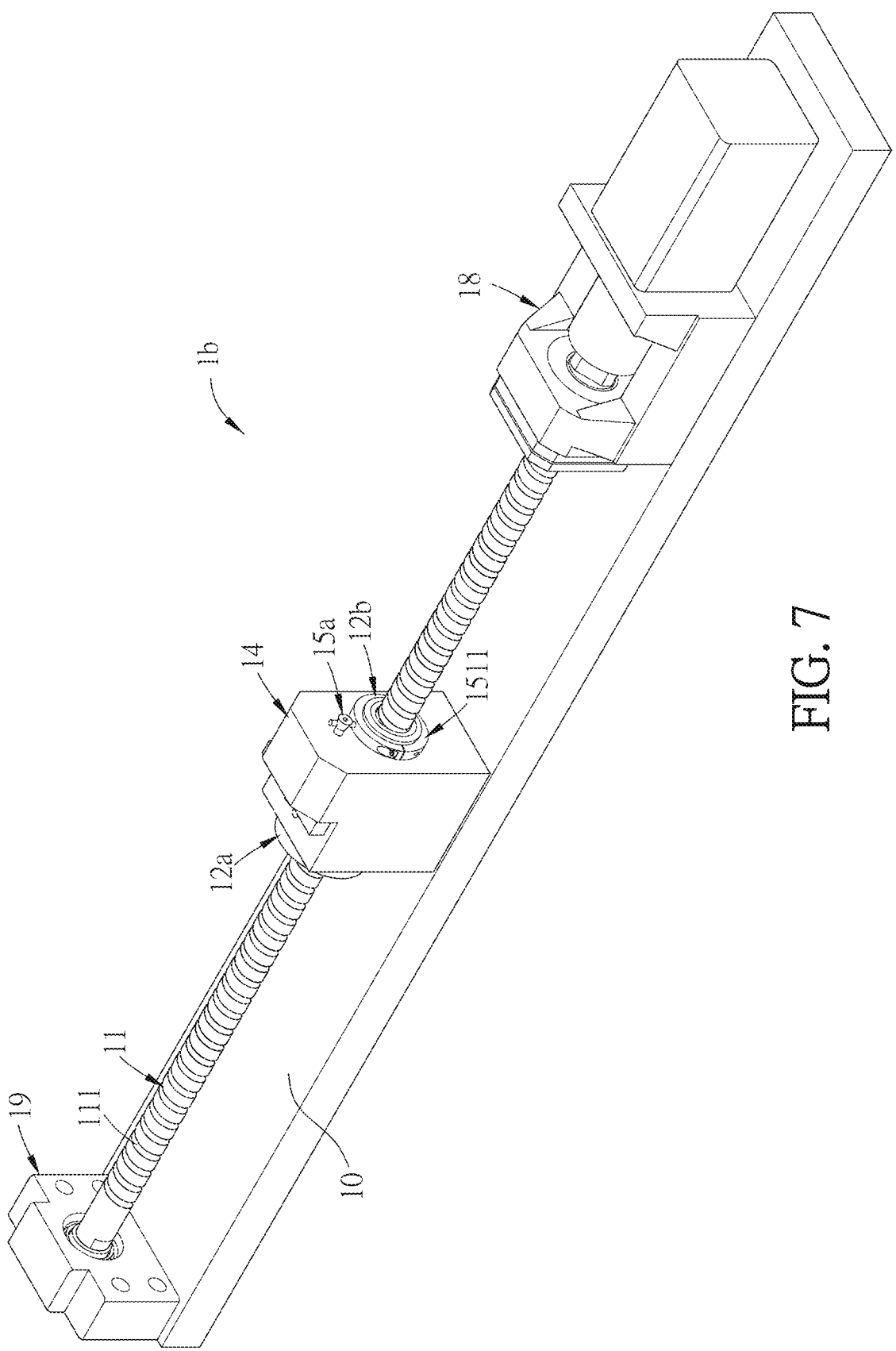
FIG. 7 is a schematic diagram showing a linear motion system according to another embodiment of this disclosure.
Figure 8A:
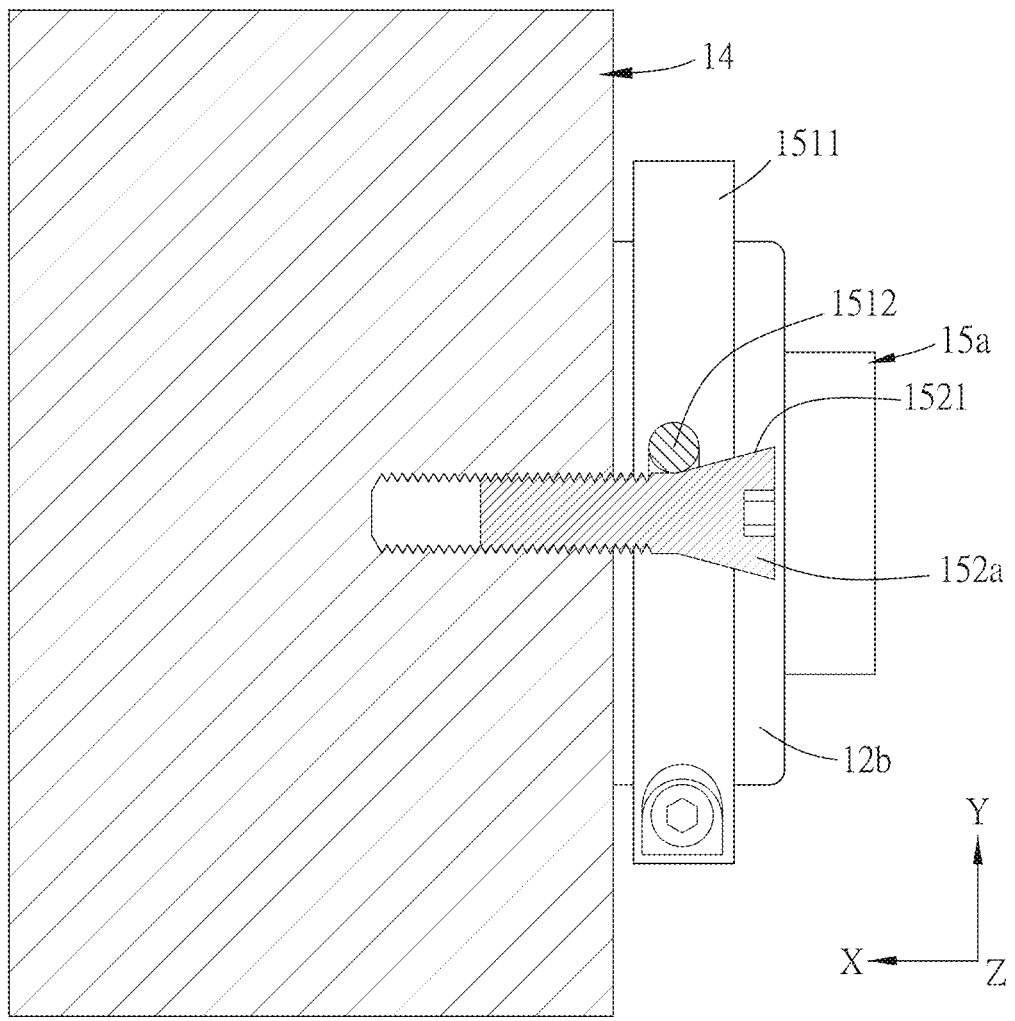
FIGS. 8A and 8B are schematic diagrams showing the operations of preload adjustment for the linear motion system as shown in FIG. 7.
Figure 8B:
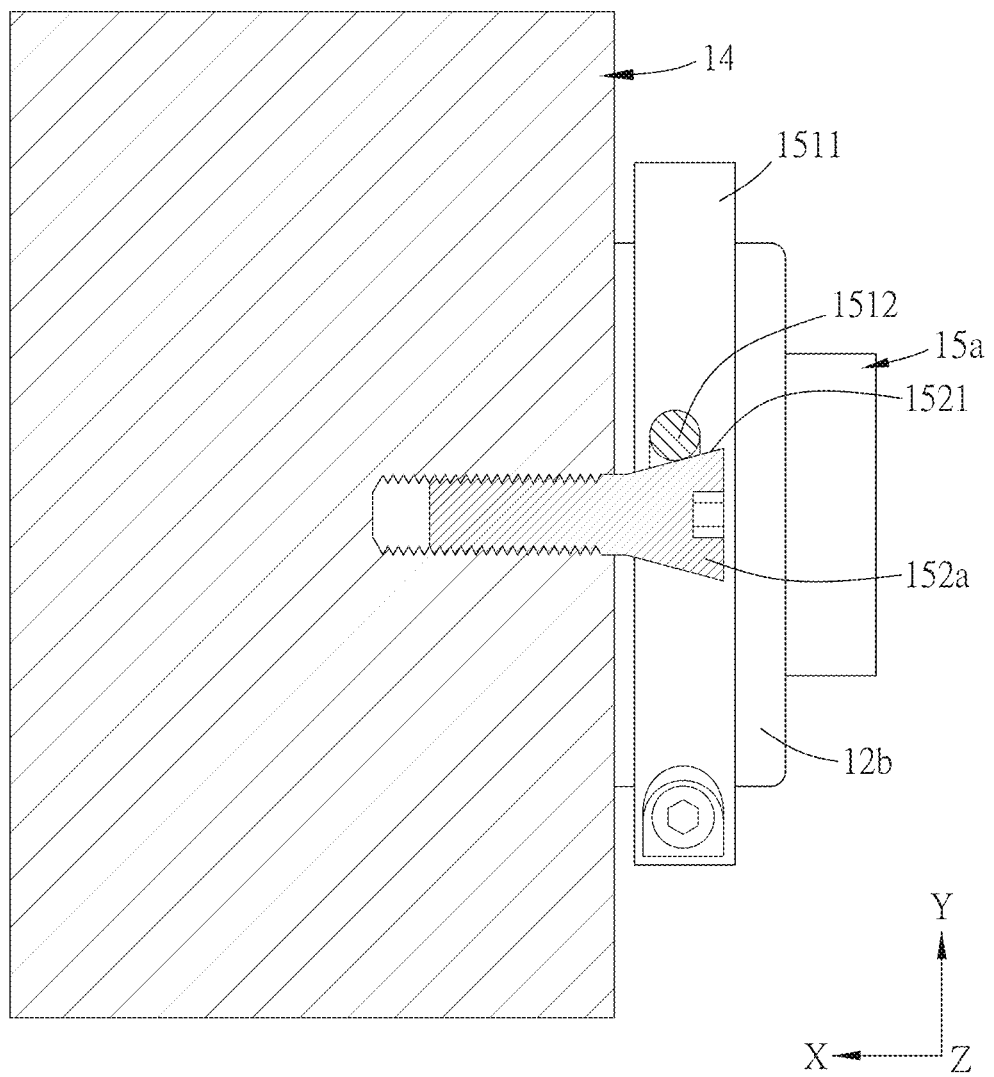

FIG. 7 is a schematic diagram showing a linear motion system according to another embodiment of this disclosure, and FIGS. 8A and 8B are schematic diagrams showing the operations of preload adjustment for the linear motion system as shown in FIG. 7.

Referring to FIGS. 7 and 8A, the linear motion system 1b of this embodiment is mostly the same as the linear motion system 1 of the previous embodiment. Different from the previous embodiment, in the linear motion system 1b of this embodiment, the preload regulator 152a of the preload adjusting module 15a (FIG. 8A) is a screw. One end of the preload regulator 152a is disposed at (screwed into) one side of the carrier body 14 facing toward the adjusting member 1511, and the other end thereof comprises a cone side surface 1521, which contacts against the adjusting rod 1512 and tightly connects to the adjusting rod 1512. Accordingly, when the user finds that the stiffness or accuracy of the device or system is lowered, or the preload value deviates from the original setting (for example, the lowered accuracy means that the preload value deviates from the original setting), he/she can rotate the preload regulator 152a for moving the preload regulator 152a toward the carrier body 14 (referring to FIGS. 8A and 8B). To be noted, the moving direction of the preload regulator 15 is the direction X, which is parallel to the long-axis direction of the guiding member 11. Since the cone side surface 1521 of the preload regulator 152a is tightly connected to the adjusting rod 1512, when the preload regulator 152a is rotated and inserted into the carrier body 14 deeper, it can provide a thrust to press (push) the adjusting rod 1512, thereby moving the adjusting rod 1512 in the direction Y, which is a direction leaving the other end of the adjusting member 1511. Herein, the direction of the thrust is the direction Y, which is perpendicular to the long-axis direction of the guiding member 11. As a result, the user can rotate the adjusting member 1511 to adjust the thrust applied to the periphery of the nut 12b, so as to adjust the preload value. That is, the preload generated by the rolling members (balls) 13a and 13b and applied to the nuts 12a and 12b can be manually adjusted to, for example, a preset value, thereby achieving the desired offset preload and the function of manual compensation.

Accordingly, the linear motion system 1b of this embodiment can utilize the preload regulator 152a and the preload assembly 151 to adjust the offset preload value between the rolling members 13a and 13b and the nuts 12a and 12b without disassembling the device, thereby performing the adjustment of offset preload without increasing the operation time and cost for disassembling the device and with small impact on production capacity.

To be noted, the technical features of the preload sensing member 16 and the monitor device 17 of the above-mentioned linear motion system 1a can also be applied to the linear motion system 1b of the current embodiment. The specific technical contents thereof can be referred to the above embodiment, so the detailed description thereof will be limited.

To be noted, in the embodiment of FIG. 2, if the preload regulator is a screw penetrating through the fixing member 153, when the user finds that the stiffness or accuracy of the device or system is lowered, or the preload value deviates from the original setting, he/she can rotate the screw for providing a larger thrust to the adjusting rod 1512. Accordingly, the preload value can be adjusted by increasing the thrust pressing (pushing) the adjusting rod 151, thereby manually adjusting the preload generated by the rolling members (balls) 13a and 13b and applied to the nuts 12a and 12b to a preset value. This operation can also achieve the desired offset preload and the function of manual compensation.

In summary, in the linear motion system of this disclosure, the moving member is slidably disposed on the guiding member, and when the guiding member moves with relative to the moving member, the moving member generates a linear movement with relative to the guiding member. The preload adjusting module is disposed on the moving member and comprises a preload assembly and a preload regulator. The preload regulator applies a thrust to the preload assembly to adjust a preload value generated by the rolling members and applied to the moving member. Accordingly, the linear motion system of this disclosure can utilize the preload regulator and the preload assembly of the preload adjusting module to adjust the preload value, which is generated by the rolling members and applied to the moving member, without disassembling the device, thereby achieving the desired offset preload and the function of semi-automatic or manual compensation. Moreover, this disclosure can adjust the offset preload value without disassembling the device, thereby performing the adjustment of offset preload without increasing the operation time and cost, and with quite limited impact on production capacity.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A linear motion system, comprising:
   a guiding member;
   a moving member slidably disposed on the guiding member, wherein the moving member and the guiding member together form at least one circulation path, and when the guiding member moves with relative to the moving member, the moving member generates a linear movement with relative to the guiding member;
   a plurality of rolling members accommodated in the circulation path; and
   a preload adjusting module disposed on the moving member and comprising a preload assembly and a preload regulator;
   wherein, the preload regulator applies a thrust to the preload assembly to adjust a preload value generated by the rolling members and applied to the moving member,
   wherein the moving member comprises two nuts and a carrier body, the carrier body has a through hole, and the nuts are individually disposed in the through hole,
   wherein the preload assembly comprises an adjusting member and an adjusting rod, the adjusting member is disposed on one of the nuts and tightly fitted to a periphery of the nut, and one end of the adjusting rod is disposed on the adjusting member.

2. The linear motion system of claim 1, wherein a direction of the thrust is perpendicular to a long-axis direction of the guiding member.

3. The linear motion system of claim 1, wherein the adjusting member comprises two adjusting sub-members.

4. The linear motion system of claim 1, wherein the preload regulator is disposed at one side of the carrier body facing toward the adjusting member.

5. The linear motion system of claim 4, wherein the preload regulator applies the thrust to the adjusting rod for adjusting the preload value generated by the rolling members and applied to the moving member through the adjusting member.

6. The linear motion system of claim 4, wherein one end surface of the preload regulator contacts against the adjusting rod for applying the thrust in a constant value to the adjusting rod.

7. The linear motion system of claim 6, wherein the preload regulator is a damp thruster.

8. The linear motion system of claim 4, wherein the preload regulator has a cone side surface, the cone side surface contacts against the adjusting rod, and a moving direction of the preload regulator is parallel to the long-axis direction of the guiding member.

9. The linear motion system of claim 1, further comprising:
   a preload sensing member disposed on the moving member; and
   a monitoring device electrically connected to the preload sensing member.

10. The linear motion system of claim 9, wherein the preload sensing member detects the preload value to output a detecting signal to the monitoring device.

11. The linear motion system of claim 10, wherein the monitoring device comprises a display monitor, and the monitoring device enables the display monitor to display a current preload value in real-time according to the detecting signal.

12. The linear motion system of claim 10, wherein the monitoring device transmits the detecting signal and the preload value to a cloud device for performing statistics and analysis of data and signals.

13. The linear motion system of claim 12, wherein the monitoring device is configured in a cloud device.

14. The linear motion system of claim 1, wherein the linear motion system is applied to a ball screw, a single-axis motion device, or a linear motion guide device.

* * * * *